Oct. 13, 1964 W. E. WINSCHE ETAL 3,152,984
METHOD OF DEHYDRATING AND INSOLUBILIZING AN
AQUEOUS NUCLEAR REACTOR WASTE SOLUTION
Filed May 14, 1962
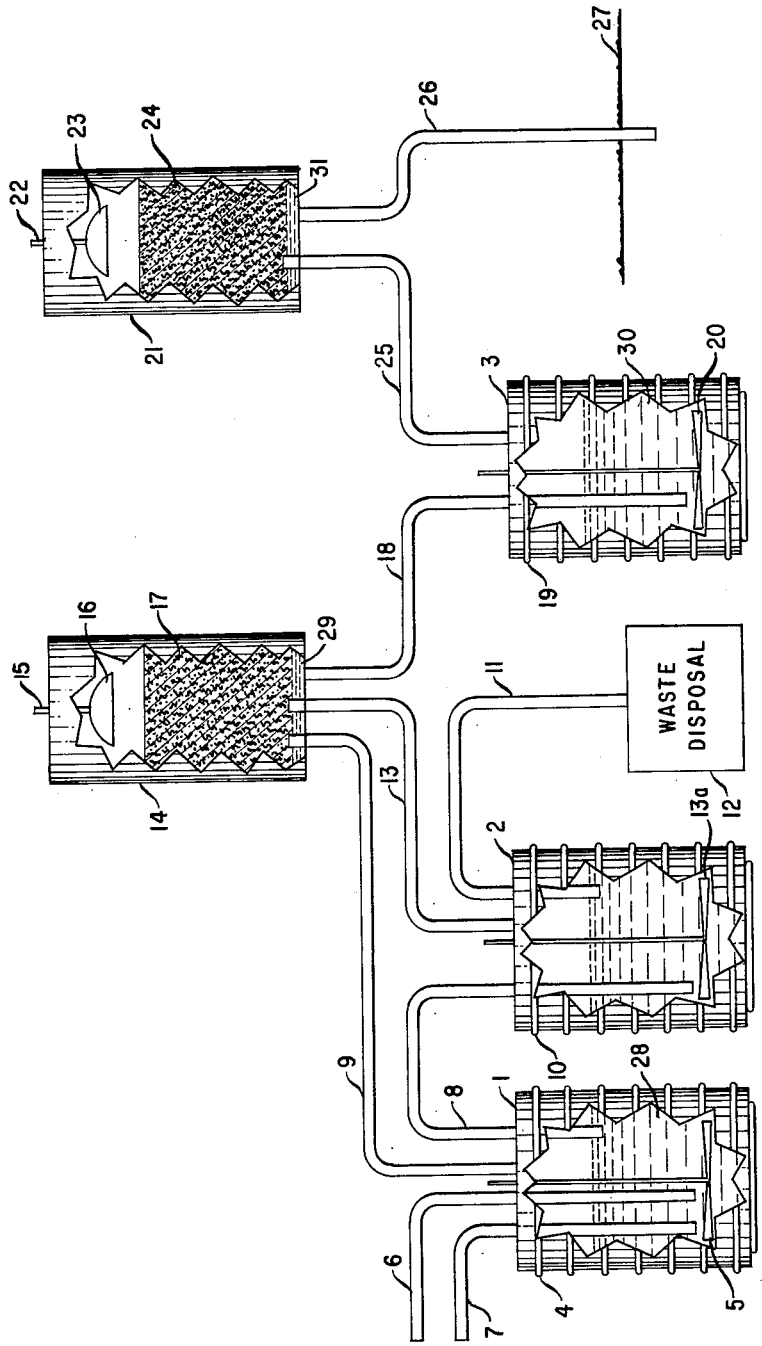
INVENTOR.
WARREN E. WINSCHE
BY MILTON W. DAVIS, JR.
ATTORNEY

United States Patent Office 3,152,984
Patented Oct. 13, 1964

3,152,984
METHOD OF DEHYDRATING AND INSOLUBILIZING AN AQUEOUS NUCLEAR REACTOR WASTE SOLUTION
Warren E. Winsche and Milton W. Davis, Jr., Aiken, S.C., assignors to the United States of America as represented by the United States Atomic Energy Commission
Filed May 14, 1962, Ser. No. 194,739
7 Claims. (Cl. 210—24)

The invention relates to a novel method of nuclear reactor waste disposal, more particularly to the dehydration, insolubilization and solidification of aqueous nuclear reactor waste solutions containing long-lived radioisotopes in such a way as to make the resulting solids suitable for storage for an indefinite period, and to a novel apparatus for carrying it out.

No completely satisfactory means have been found for the disposal of the fission products formed in nuclear reactors and separated in fuel reprocessing facilities. Neutron-irradiated fuel elements such as uranium metal or uranium oxide fuel elements are commonly dissolved in an aqueous mineral acid such as nitric acid, and the resulting solution is then stripped of its uranium and plutonium values by solvent extraction or some other extraction method. The remaining acidic waste solution is highly radioactive from the presence of a broad spectrum of fission products including strontium, cesium, ruthenium, and zirconium.

The aqueous waste stream may also contain cladding material such as aluminum, stainless steel, zirconium and alloying elements, depending on whether or not the fuel has been separately declad before dissolution. Other materials may also be present such as chemicals added to change the pH or oxidation state of the system.

The most common means for disposing of such waste streams has been to concentrate the solution in a heating apparatus which dehydrates the solution and also, in the case of nitrate solutions, denitrate it to some extent by driving off $HNO_3$ vapor. Other mineral acids such as hydrochloric are driven off in the same way. The concentrated waste solution, either acidic or neutralized, is then stored in large underground tanks. Great difficulty has been experienced, however, in making such tanks entirely leakproof; saucer-shaped basins have to be located beneath the tanks with sump pump lines leading into them to take care of seepage of the radioactive materials which would otherwise get into underground water. Besides a threat is always present of a major disaster in case a tank should be damaged by earthquake, enemy action, or even by large scale corrosion.

Another method that has been proposed is to evaporate a waste stream to dryness and then to calcine the solids at high temperature to convert the solubule salts such as nitrates, chlorides and the like to insoluble forms such as oxides. The drawbacks to this method are that the dried calcined materials tend to become dusty, which make them far more hazardous to handle than in a liquid state, and one of the major fission products, ruthenium-106, tends to volatilize in the form of ruthenium tetroxide. Safety considerations require that this gamma emitting isotope be kept from the atmosphere, and filters used for this purpose are both expensive and constitute a serious disposal problem.

Another means proposed for fixing waste is to contain it with a mass such as glass or concrete to reduce leachability. However, this method is quite expensive and the materials are vulnerable to extended exposure to high radiation. Furthermore, these materials must be handled as solids, and cannot be pumped.

It is, accordingly, the general object of the present invention to provide a method of calcining and solidifying nuclear reactor waste.

It is a more particular object to provide a method of insolubilizing and solidifying an aqueous nuclear reactor waste solution without the hazards of dustiness and volatilization of ruthenium tetroxide.

It is a further object to provide a novel apparatus for carrying out the above methods.

Other objects will appear as the description proceeds.

In accordance with the present invention fission product species, especially those present in aqueous solution and slurry forms, are insolubilized by incorporating the same in a menstruum of molten sulfur, thereby promoting dehydration and progressive conversion of the species to substantially insoluble forms, and thereafter cooling the menstruum to solidify same, thereby encapsulating the resulting species within a solid water-repellent matrix which is virtually immune to degradation by the radiation of the species. It has further been found that cladding materials, such as dissolved aluminum, stainless steel, and the like, as are often present in such waste streams are beneficially likewise generally insolubilized and encapsulated, along with the fission product species, by the instant sulfur treatment. The resulting matrix is a cohesive, solid mass which, however, is capable of being melted at comparatively low temperatures, whereby it can be easily put into protective containers and later be removed therefrom and converted into different shapes, which can be comparatively small at the outset for surface cooling and which may safely be made larger with the passage of time as the heat buildup of the radioactivity diminishes; likewise the melted matrix can be easily handled as by pumping, even into holes drilled deep into rock formations or other cavities in the ground. When disposed of in the last mentioned way the water repellency of the matrix, together with the insolubilization of the species and the occluding action of the matrix, minimizes leaching of the radioactive species should underground water reach the site of the underground disposal, thereby greatly lessening the safety hazard thereof. The method is most simple and economical in that the dehydration, insolubilization and occlusion within the matrix can be carried out as a one-step process using simple equipment, and resort can be made to raw sulfur, which is a cheap and abundant material.

We have discovered several features which are to be preferred in carrying out the invention. These include certain temperatures and the presence or absence of certain materials, which will be explained as the description of the invention proceeds.

Preliminary to the practice of the invenion it is preferable to dehydrate the waste solution by conventional evaporation methods until it becomes a thick slurry. Up to this point the disadvantages of conventional methods such as dustiness are not involved, and the only practical consideration is that the slurry shall not become too thick to be pumped, which normally happens when the solids exceed about 70% by weight. As a matter of fact, the solution can be dehydrated to the point where it becomes a salt mixture free of water other than water of hydration; however, this is disadvantageous in that the mixture ordinarily has to be fused in order to be pumped. The slurry is brought into contact wth sulfur, batchwise or, preferably, in continuous fashion. Whichever method is used, the contact should preferably be in a closed vessel to prevent spattering of sulfur and water, and in the presence of an inert atmosphere. Any of the inert gases may be used, but nitrogen is sufficiently inert for this purpose, and because of its cheapness is therefore preferred.

The portions between sulfur and the quantity of waste to be heated may vary considerably. In general, whatever the form of the waste—be it aqueous solution, slurry, hydrate melt or other—the volume of sulfur into which it is incorporated should preferably exceed that of the waste such that the sulfur may constitute a substantially continuous phase throughout the elevated temperature treatment in the interest of promoting efficient reaction. For this, about two to four parts sulfur to one of waste feed is especially suitable. Too, it is further advantageous to employ sufficient sulfur to provide a substantial gravimetric excess thereof over the resulting insolubilized waste materials in the ultimate solidified condition, toward favoring sound cohesiveness of the solid mass. Ordinarily, the bulk of fuel cladding material, when present along with mere trace amounts of fission product species, is the controlling factor. For example, in the use of waste derived from dissolved aluminum clad, fuel elements, the concentration of aluminum in the mass should best not exceed about 10 "molar" (i.e., 10 moles per liter of melt); in the case of stainless steel-clad elements the combined iron, chromium, and nickel concentration may be as high as 20 molar with good results.

The temperature of the initial reaction between the waste and sulfur is important. This should be best maintained as close as practical to 155° C. since at this temperature the viscosity of sulfur is at a minimum, increasing markedly as it is either raised or lowered. In general, the temperature range of from 130° to 160° C. is especially satisfactory. The water in the waste, including the water of hydration, will then leave the mixture as steam, and also such volatile gases as the oxides of nitrogen, hydrogen chloride and the like which are the decomposition products of the anions of the mineral acids which are hydrolyzed at this temperature. Vigorous stirring is beneficial at this point in order to assist the escape of the steam and other gases; otherwise the mixture will tend to foam up and escape from the reaction vessel. This should be continued until the evolution of gases ceases, which depends, in turn, on the quantity of reactants within the vessel.

After the evolution of gases is complete the temperature of the mass is preferably raised to what we call the insolubilization temperature. In other processes this is referred to as the calcining temperature, but our process may be carried out at much lower temperatures than conventional calcining temperatures, and besides we have reason to believe that our process causes insolubilization of certain material for other reasons than calcination. Hence, because more than calcination is involved we will refer to this step of our process as insolubilization. We have found that it can be carried out within the range of from about 350° to 444° C., the latter being the boiling point of sulfur at atmospheric pressure. While it is generally unnecessary to carry out the process at superatmospheric pressures and temperature above the boiling point, such may be used for attaining still faster reaction rates. We have found that within the range of 350° to 444° C. fission products are amply calcined or otherwise converted to insoluble form so that they are suitable for long term storage.

Due to the complexity of the wastes it is not possible to offer a detailed explanation of all the chemical reactions involved, but it appears that sulfur, in the case of ruthenium, acts as a reducing agent, thereby keeping it in an oxidation state lower than plus eight and eliminating the production of the volatile tetroxide. With respect to certain other constituents, sulfur acts to promote calcination, since aluminum is found to have been mainly converted to alumina. In other cases, its action may be looked upon as simply metathetical as when iron nitrate, chloride and other such salts are converted to sulfides by reacting with the sulfur of the menstruum. It might be noted that it is particularly advantageous that aluminum is not converted to a sulfide, since $Al_2S_3$, unlike $Al_2SO_3$, is somewhat soluble in water. Even in the case of the occasional fission product species, such as cesium, which have very few insoluble salts, treating and encapsulating them with sulfur according to the invention proves to prevent or greatly reduce their being leached; this may, of course, be due entirely to physical occlusion by the sulfur, although it has been suggested that formation of more insoluble complexes may be responsible. Whatever the validity of these or any other theories concerning the operation of our invention, we do not wish to be rigorously bound thereby; the invention is offered on the basis of our empirical findings, based on actual experiments.

We have found that certain temperatures within the insolubilization temperature range of 350° to 444° C. are preferable for waste solutions. For solutions of fuel elements which were clad in stainless steel and hence predominantly of iron, chromium and nickel, the upper limit, or 444° C., gives best results when carried out for three, and preferably five hours. For fuel elements clad with aluminum the results at 400° C. are superior to results at 444° C. No complete explanation for this variance has been established; photomicrographs of castings seem to indicate that a more definitely granular structure is produced at the lower temperature, but here again our findings are offered on an empirical basis and not bound to any particular theory.

Waste from separately declad, or decanned, fuel elements may be treated according to the invention. However, when cladding metal is present resistance to leaching is ofttimes significantly better than when such a metal is absent. This might be explained as being due to an occluding effect accompanying the formation of sulfides of the cladding metal such as iron sulfide in the case of stainless steel. However, in the case of aluminum-clad elements it is observed that little, if any of the aluminum is converted to sulfide; as stated above most of it is converted to alumina along with minor amounts of aluminum sulfate, or thiosulfate.

In the disposal of waste solutions our invention contemplates the general dehydration and insolubilization process as above described. The melt of sulfur and waste may then be cast into shapes with dimensions which will permit the dissipation of the heat generated by the radioactivity of the fission products. For this purpose we prefer a cylinder of from about 4 to about 8 inches in diameter and of any convenient length. Preferably the casting may be made into a metal tube with these inner dimensions and the tube left on the cylinder as an extra protection. Aluminum is our preferred metal for this purpose because of its corrosion resistance and low cost.

The canned cylinders, or tubes, may beneficially be left in water for heat-absorption for about three years, until the major part of the heat-producing radioactivity decays. After that the tubes can be placed underground to protect the public from the long-lived radioisotopes such as $Sr^{90}$ and $Cs^{137}$ whose decay is a matter of centuries. Alternatively, the castings can at that time be removed from their tubes, melted by steam and flowed into underground cavities by the Frasch sulfur removal process working in reverse. This is considered to be an advantage of the invention over the methods employing glass and concrete as encapsulating materials, which cannot be handled in this way.

In carrying out the invention certain additives have been found useful. About one weight percent of "Thiokol A," registered trademark of the Thiokol Chemical Corporation, a sulfur-containing rubber-like polymer, added to the sulfur improves resistance to cracking by the cast specimens. About 0.77 weight percent of elemental iodine reduces the viscosity of sulfur at its maximum which occurs within the range of from about 188° C. to about 265° C. Furthermore, we have found that chromium deriving from its presence in the initial waste appears to improve the resistance to leaching and the mechanical strength of cast specimens containing iron compounds. In fact the presence of iron, chromium and nickel compounds has been found to have so pronounced an effect in hardening, strengthening, and solidifying the ultimate sulfur matrix, that these materials may beneficially be added to the menstruum as reagents for achieving such additional improvement.

Attention is now directed to the drawings, the only figure of which is a partly schematic, broken out view of an apparatus for carrying out the invention.

The numeral 1 designates a first heating vessel, 2 a second heating vessel, and 3 a third heating vessel. Closely surrounding the first heating vessel 1 is heater coil 4, which is capable of raising the contents of the vessel to the dehydration temperature of from about 130° to about 160° C., and within it is an agitator 5. Entering the vessel 1 are aqueous waste line 6 and sulfur line 7; and leading from it is liquid transfer line 8 and off-gas conduction line 9.

Second heating vessel 2 is closely surrounded by heating coil 10 which is capable of raising the temperature of the contents of the vessel 2 to an insolubilizing temperature of from about 350° to about 444° C. Leading into the vessel 2 is the liquid transfer line 8 from vessel 1, and leading from it is treated waste product line 11 which leads to waste disposal means shown schematically by legend at 12. Also leading out of the vessel 2 is off-gas conduction line 13. Vessel 2 has an agitator 13a.

First scrubber 14 has entering it tap water inlet line 15 leading to sprinkler head 16 which distributes the water over packing 17. Entering first scrubber 14 through its bottom are off-gas conduction lines 9 and 13, and leaving it is liquid drain line 18.

Third heater vessel 3 has closely surrounding it heating coil 19 which is capable of maintaining the temperature of the contents of the vessel to from about 130° to about 160° C. The vessel 3 has agitator 20, it being understood that agitators 5, 13a and 20 are all connected to sources of torque (not shown). Drain line 18 conducts the solution produced in scrubber 14 into vessel 3.

Second scrubber 21 has water inlet means 22, sprinkler head 23, and packing 24. Off-gas conduction line 25 bring off-gas from vessel 3 to scrubber 21, and liquid drain line 26 conducts the solution produced in second scrubber 21 to the ground 27.

In operation a continuous flow of sulfur enters vessel 1 through sulfur line 7 and a continuous flow of aqueous slurry enters by line 6, the flow ratio between these being desirably from between 2 and 4 to 1, and preferably 3 to 1. The sulfur is preheated, and line 7 may optionally be provided with a heating means (not shown) if required. The two reactants enter the vessel 1 near its bottom and gradually work to the upper surface assisted by the agitator 5. Heating coil 4 by maintaining a temperature on the order of 155° C. brings about the dehydration of the mixture of waste and sulfur within the vessel 1 and also drives off the more volatile components of the slurry, these being chiefly the decomposition products of the anions of the mineral acids or salts, such as oxides of nitrogen, hydrogen chloride, chlorine, oxides of sulfur and the like; these, together with the vaporized water, escape through off-gas line 9 into first scrubber 14.

By constricting the off-gas line 9, sufficient pressure can be generated within vessel 1 to cause a gas lift of the upper part of the sulfur-waste mixture 28 into the liquid transfer line 8, and thence into vessel 2 where the line 8 enters near the bottom.

In vessel 2 the insolubilization reaction takes place at the higher temperature range of about 350° to about 444° C., maintained by heater coil 10. As in the case of vessel 1 the contents rises from the bottom to the top and finally is gas-lifted out through line 11 into the final waste disposal means 12. Off-gas from vessel 2 will be less than in vessel 1, but the minor amount that is produced is bled off through line 13 into first scrubber 14.

In scrubber 14 the off-gases from lines 9 and 13 rise upward through the packing 17, where they meet and are dissolved by the water cascading downward from the sprinkler head 16, thereby creating solution 29 which drains through line 18 into the third vessel 3. This vessel is charged with sulfur 30, but since this is only a safety feature it is sufficient if the sulfur is added in batches, rather than continuously. Since coil 19 maintains the temperature of vessel 3 at from about 130° to about 160° C., the water and other volatile substances will quickly leave through off-gas conduction line 25 and enter second scrubber 21. The purpose of sulfur 30 is merely to entrap the minor amounts of non-volatile substances entrained by the water vapor coming from vessels 1 and 2, and since these are not great one charging of vessel 3 lasts indefinitely.

The off-gas forms a second solution 31 in second scrubber 21 in the same way as in the first scrubber 14, which drains through the line 26 into the ground or is similarly discarded.

EXAMPLE I

Fuel elements of aluminum-natural uranium alloy clad with aluminum were withdrawn from a nuclear reactor after a period of service therein and dissolved in aqueous nitric acid. The resulting solution was diluted with water, and after solvent extraction of its uranium values the resulting feed solution was 2.0 molar in aluminum and had sufficient plutonium to give $2.3 \times 10^7$ d./m./ml. (disintegrations per minute per milliliter) as shown by radiometric analysis. Gamma count was $1.25 \times 10^9$ c./m./ml. (counts per minute per milliliter), and its beta count was $1.39 \times 10^{10}$ c./m./ml., the latter counts being attributable, of course, to a broad spectrum of fission products.

The feed solution was gradually fed into molten sulfur in an amount sufficient to make 4.7 moles of aluminum in each 1000 cc. of the final product. The solution-sulfur menstruum was maintained at 150° C. until evolution of gas ceased, after which it was heated to 444° C., which temperature was maintained for one hour. During the heating at both temperatures the off-gas was led into a water scrubber, and the resulting aqueous solution was counted for gamma and beta activity. The fraction of these activities so counted, as compared to those of the feed solution is recorded in Table I below.

Following the heating samples of the menstruum were cast into right circular solid cylinders 1.25 inches in diameter and 1.5 inches high, which, on solidification, were placed in separate bottles, and 175 ml. of water was added to each bottle.

Each week the immersing water from each bottle was poured off and counted for beta and gamma activity, and fresh charges of 175 ml. of water placed in each bottle. The immersion water was also radiometrically analyzed for plutonium. The countings and the plutonium analyses were recorded, and converted for each type of activity, to leaching data in terms of mils of penetration per year according to the following formula:

$$\frac{2.52 \times 10^7 \times A_w}{P \times A_s \times S} = R$$

where $A_w$ is the activity of the immersion water in counts per minute per milliliter (c./m./ml.), P is the period of immersion in days, $A_s$ is the activity of the solid cylinder which, in turn, is the activity in the feed solution in counts per minute divided by the number of cubic centimeters in the menstruum (c./m./cc.), S is the surface area of the cylinder in square centimeters and R is the penetration rate in mils per year. Since R gives the penetration by leaching to be expected on the surface of a sulfur-based matrix made according to the invention, it gives a forecast of what is to be expected in the future if water should come into contact with a matrix of this kind during waste storage.

The leaching of the samples in mils per year is shown in the following Table I, as determined by the beta and gamma activities of the immersion water and the plutonium analyses; the latter is recorded as "Pu" in the table, and the beta and gamma activities, tabulated separately, are attributed to the fission products.

*Table I.—Results of Calcining High Activity Waste in Sulfur*

FEED ACTIVITY $\gamma = 1.25 \times 10^9$ c./(min.)(ml.)
$\beta = 1.39 \times 10^{10}$ c./(min.)(ml.)
$Pu = 2.3 \times 10^7$ d./(min.)(ml.)

Aluminum concentration in feed, M ........................... 2.0
Aluminum concentration in product, M ........................ 4.7
Heating (mixture heated at 150° C. until evolution of gas ceased):
  Insolubilization temperature, ° C ............................ 444
  Time, hr .................................................... 1
Activity in off-gas cleaning equipment, fraction of activity:
  Gamma ...................................................... $1/(5.4 \times 10^4)$
  Beta ....................................................... $1/5(5.9 \times 10^4)$ Leach rate (duplicate samples), mils/yr.:

|  | $\gamma$ | $\beta$ | Pu |
|---|---|---|---|
| 1st week | 75–71 | 12–10 |  |
| 2nd week | 41–53 | 5–7 |  |
| 3rd week | 57–49 | 8–7 |  |
| 4th week | 37–37 | 5–5 |  |
| 5th week | 27–27 | 4–4 |  |
| 6th week | 27–27 | 4–4 |  |
| 7th week | 29–29 | 4–4 |  |
| 8th week | 18–20 | 3–3 | 1–1 |
| 9th week | 23–19 | 4–3 |  |

In addition to the above leaching data visual observation has been made of the samples of this example, and after 14 weeks they showed a sound, uncracked appearance.

EXAMPLE II

An aqueous feed solution had a molarity of 2.7 of the combined nitrates resulting from the dissolution in nitric acid of a stainless steel having the following weight percentages: Cr about 18, Ni about 10, and the balance Fe. This solution was divided into aliquots, some of which were spiked with tracer amounts of radiostrontium, some with radiocesium, and some were left unspiked. The aliquots were separately fed into a stainless steel vessel heated by an external heating coil and with an agitator ¼ inch from the bottom with a four-bladed paddle of stainless steel. Sulfur at 150° C. was present in the vessel in about three times the volume of each aliquot. The melt was maintained at 150° C. with agitation until evolution of gas ceased. Thereafter, with the agitation continuing, the aliquots were heated either to 400° C. or 440° C. for varying times as hereinafter indicated; the resulting melt was then cast into cylinders 1.25 inches in diameter and 1.5 inches high and subjected to leaching tests by immersing each in 175 ml. of water, each sample being in a separate beaker. At intervals the immersion water was poured off and radiometrically counted for radioactivity, and the counts converted to mils per year as in Example I, 175 ml. of fresh water being used to replace the poured-off water in each beaker.

The results of this procedure are set forth in Table II:

*Table II.—Leaching Tests of Castings of Stainless Steel Waste Concentrated in Sulfur*

[Mixtures heated at 150° C. during addition of waste to sulfur]

| Precasting Heating | | Waste Components Added to Sulfur, g./cm.³ casting | | | Tracer in Casting | Leaching in Tap Water at 22° C. | | Condition of Immersed Casting |
|---|---|---|---|---|---|---|---|---|
| ° C. | Hr. | Fe | Cr | Ni |  | Days | Mils/yr.ª |  |
| 400 | 1 | .202 | .050 | .028 | None | | | Cracked after 40 days. Ruptured after 278 days. |
|  |  | .240 | .060 | .033 | Cs | 0–28 | 132 | Sample broke in half after 24 days. Unchanged after 285 days. |
|  |  |  |  |  |  | 28–56 | 83 |  |
|  |  |  |  |  |  | 56–84 | 108 |  |
|  |  |  |  |  |  | 84–112 | 49 |  |
|  |  |  |  |  |  | 112–140 | 48 |  |
|  |  |  |  |  |  | 140–168 | 45 |  |
|  |  |  |  |  |  | 168–196 | 42 |  |
|  |  |  |  |  |  | 196–224 | 47 |  |
|  |  |  |  |  |  | 224–252 | 41 |  |
| 400 | 3 | .226 | .056 | .031 | None |  |  | Solid after 280 days. |
|  |  | .240 | .060 | .033 | Cs | 0–28 | 67 | Crumbled at base after 242 days. |
|  |  |  |  |  |  | 28–56 | 66 |  |
|  |  |  |  |  |  | 56–84 | 12 |  |
|  |  |  |  |  |  | 84–112 | <10 |  |
|  |  |  |  |  |  | 112–140 | <10 |  |
|  |  |  |  |  |  | 140–168 | <10 |  |
|  |  |  |  |  |  | 168–196 | <10 |  |
|  |  |  |  |  |  | 196–224 | <10 |  |
|  |  |  |  |  |  | 224–252 | <10 |  |
| 400 | 5 | .202 | .050 | .028 | None |  |  | Solid after 287 days. |
|  |  | .225 | .056 | .031 | Cs | 0–28 | 44 | Solid after 255 days. |
|  |  |  |  |  |  | 28–56 | <10 |  |
|  |  |  |  |  |  | 56–84 | <10 |  |
|  |  |  |  |  |  | 84–112 | <10 |  |
|  |  |  |  |  |  | 112–140 | <10 |  |
|  |  |  |  |  |  | 140–168 | <10 |  |
|  |  |  |  |  |  | 168–196 | <10 |  |
|  |  |  |  |  |  | 196–224 | <10 |  |
|  |  | .240 | .060 | .033 | Sr | 0.14 | 21 | Crumbled after 21 days. |
|  |  |  |  |  |  | 14–28 | 38 |  |
|  |  |  |  |  |  | 28–35 | 54 |  |
| 444 | 1 | .426 | .106 | .059 | Cs | 0–28 | 37 | Solid after 124 days. |
|  |  |  |  |  |  | 28–56 | 10 |  |
|  |  |  |  |  |  | 56–84 | <10 |  |
|  |  |  |  |  |  | 84–112 | <10 |  |
|  |  | .426 | .106 | .059 | Sr | 0–28 | 10 | Solid after 139 days. |
|  |  |  |  |  |  | 28–56 | 10 |  |
|  |  |  |  |  |  | 56–84 | 10 |  |
|  |  |  |  |  |  | 84–112 | 10 |  |
|  |  |  |  |  |  | 112–140 | 10 |  |

See footnote at end of table.

*Table II—Continued*

[Mixtures heated at 150° C. during addition of waste to sulfur]

| Precasting Heating | | Waste Components Added to Sulfur, g./cm.³ casting | | | Tracer in Casting | Leaching in Tap Water at 22° C. | | Condition of Immersed Casting |
|---|---|---|---|---|---|---|---|---|
| ° C. | Hr. | Fe | Cr | Ni | | Days | Mils/yr.[a] | |
| 444 | 3 | .385 | .096 | .053 | Cs | 0–28<br>28–56<br>56–84<br>84–112 | 10<br>10<br>10<br>10 | Solid after 121 days. |
|  |  | .550 | .137 | .076 | Sr | 0–28<br>28–56<br>56–84<br>84–112<br>112–140 | 10<br>10<br>10<br>10<br>10 | Solid after 133 days. |
| 444 | 5 | .480 | .119 | .067 | Cs | 0–28<br>28–56<br>56–84 | 10<br>10<br>10 | Solid after 105 days. |
|  |  | .958 | .239 | .133 | Sr | 0–28<br>28–56<br>56–84<br>84–112 | 10<br>10<br>10<br>10 | Solid after 129 days. |

[a] The lower limit of analytical measurement was 10 mils/yr.

Especially noteworthy in the results in Table II is the demonstration that for a matrix containing stainless steel, resistance to leaching and cracking are improved when the mixture is heated at 444° rather than at 400° C.

EXAMPLE III

The same procedure as in Example II was carried out starting with a feed solution of 2.4 M in aluminum nitrate instead of one derived from stainless steel. Table III below shows that, in general, the leaching detected was somewhat greater than Example II, but that for an aluminum-rich system the insolubilization at 400° C. is superior to that by heating at 444° C.

*Table III.—Leaching Tests of Castings of Aluminum Waste Concentrated in Sulfur*

[Mixture heated at 150° C. during addition of waste to sulfur]

| Precasting Heating | | Aluminum Added to Sulfur, g. Al/cm.³ casting | Tracer in Casting | Leaching in Tap Water at 22° C. | | Condition of Immersed Casting |
|---|---|---|---|---|---|---|
| ° C. | Hr. | | | Days | Mils/yr.[a] | |
| 400 | 1 | 0.119 | None | | | Cracked after 2 days; cracking more extensive after 269 days. |
|  |  | 0.223 | Cs | 0–28<br>28–56<br>56–84<br>84–112<br>112–140 | 36<br>20<br>26<br>45<br>66 | Solid after 161 days. |
|  |  | 0.190 | Sr | 0–28<br>28–56<br>56–84<br>84–112<br>112–140 | <10<br><10<br><10<br>10<br>12 | Solid after 67 days. Cracked at 141 days. |
| 400 | 3 | 0.222 | Sr | 0–28<br>28–56 | | Solid after 67 days. |
| 400 | 5 | 0.14 | Cs | 0–28<br>28–56<br>56–84<br>84–112<br>112–140<br>140–168<br>168–196 | 52<br>15<br>11<br>11<br>12<br>16<br>16 | Solid except for crack around middle after 246 days. |
|  |  | 0.191 | Cs | 0–28<br>28–56<br>56–84<br>84–112<br>112–140 | 162<br>173<br>260<br>226<br>153 | Cracking without shattering after 120 days. |
|  |  | 0.205 | Sr | 0–28<br>28–56<br>56–84<br>84–112 | 10<br>10<br>40<br><10 | Solid after 154 days. |
| 444 | 1 | 0.204 | Cs | 0–28<br>28–56<br>56–84<br>84–112<br>112–140<br>140–168 | 37<br>36<br>156<br>303<br>173<br>101 | Small crack after 50 days; shattered after 144 days |
|  |  | 0.205 | Cs | 0–28<br>28–56 | 152<br>137 | Small cracks after 67 days. |
|  |  | 0.178 | Sr | 0–28<br>28–56<br>56–84<br>84–112<br>112–140<br>140–168 | 25<br>16<br>49<br>110<br>97<br>94 | Shattered after 126 days. |

See footnote at end of table.

*Table III*—Continued

[Mixture heated at 150° C. during addition of waste to sulfur]

| Precasting Heating | | Aluminum Added to Sulfur, g. Al/cm.³ casting | Tracer in Casting | Leaching in Tap Water at 22° C. | | Condition of Immersed Casting |
|---|---|---|---|---|---|---|
| ° C. | Hr. | | | Days | Mils/yr.ᵃ | |
| 444 | 3 | 0.218 | None | | | Solid after 177 days. |
| | | 0.205 | Cs | 0–28 | 31 | |
| | | | | 28–56 | 22 | |
| | | | | 56–84 | 34 | |
| | | | | 84–112 | 105 | |
| | | | | 112–140 | 120 | |
| | | | | 140–168 | 105 | |
| | | 0.178 | Sr | 0–14 | 489 | Crumbled after 35 days. |
| | | | | 14–28 | 366 | |
| | | | | 28–35 | 468 | |
| 444 | 5 | 0.203 | None | | | Cracking after 175 days. |
| | | 0.251 | None | | | Severe cracking after 41 days. |
| | | 0.201 | None | | | Cracking after 126 days. |
| | | 0.242 | Cs | 0–14 | 253 | Crumbled after 55 days. |
| | | | | 14–28 | 328 | |
| | | | | 28–42 | 255 | |
| | | | | 42–56 | 165 | |
| | | 0.178 | Cs | 0–14 | 1350 | Crumbled after 48 days. |
| | | | | 14–28 | 221 | |
| | | | | 28–42 | 104 | |
| | | | | 42–48 | 67 | |

ᵃ The lower limit of measurement is 10 mils/yr.

EXAMPLE IV

Into 700 grams of molten sulfur was fed 600 ml. of an aqueous solution of $1.75 \times 10^{-3}$ molar $CsNO_3$ spiked with $Cs^{137}$ having $4.88 \times 10^5$ gamma c./m./ml. No stainless steel, aluminum or other cladding metal was in the solution. The mixture was maintained at 155° C. and agitated with a paddle agitator for about 20 minutes, when evolution of gas ceased.

About 60.4 ml. of the mixture was then cast into two samples in the shape of cylinders 1.25" in diameter and 1.5" high, with a volume of about 30.2 ml. and a surface area of 57.8 cm.² The concentration of $Cs^{137}$ in the samples when first cast was computed to be $8.03 \times 10^5$ c./m./ml. The samples were designated CS and CS–B.

Both samples were then placed in individual vessels and immersed in 175 ml. of tap water. From time to time the water was poured off, counted, and 175 ml. of fresh water substituted. The counting rate was recorded and leaching calculated in mils of peneration per year by the same procedures used in the other examples.

The immersion water from sample CS was found to have an initial leaching rate of 95 mils per year (mils/yr.) during the first week, which fell to 20.3 in the seven day period between the 7th and 14th days, and to <10 in the 28-day period between the 175th and 203rd days. From the 14th day through the 133rd day the rate was consistently less than 5.

Sample CS–B had an initial leaching rate of 250 mils-yr. for the first week which continued to decrease to 19 in the 7-day period between the 56th and 63rd days, and all the way to <10 in the 28-day period between the 268th and 296th days. From the 126th day through the 177th day the rate was consistently less than 20, and from the 178th day through the 394th day it was consistently less than 5.

The example shows that in the absence of a cladding metal such as stainless steel or aluminum satisfactory results are achieved if the mixture is heated only to the lower temperature in one step.

EXAMPLE V

Into 700 g. of sulfur at 150° C., agitated by a paddle at 600 r.p.m., was fed 386 ml. of an aqueous feed solution over a period of 2 hrs., 17 mins. Thereafter, the resulting menstruum was maintained at the same temperature, with the same agitation, for 1 hr.

The feed solution was $1.75 \times 10^{-3}$ molar in $Sr(NO_3)_2$, spiked with a tracer amount of $Sr^{85}$, with a count of $4.56 \times 10^{-5}$ c./m./ml. No stainless steel, aluminum or other cladding metal values were in the feed solution.

A sample cylinder was then cast from the menstruum, and its leaching penetration rate determined in mils per year as in the preceding examples. The following Table IV shows the results, the letters "W.C." indicating that the immersion water was changed after the exposure period just above them.

*Table IV*

| Exposure period, days: | Pentration rate, mil/yr. |
|---|---|
| 0–3 | 17.3 |
| 3–4 | 12.0 |
| 4–6 | 25.2 |
| 6–7 | Negligible |
| 0–7 | 8.5 |
| W.C. | |
| 7–14 | <1 |
| W.C. | |
| 14–21 | <1 |
| W.C. | |
| 21–28 | 5–1 |

EXAMPLE VI

A melt of $Al(NO_3)_3 \cdot 9H_2O$ at 140° C. and spiked with $Sr^{85}(NO_3)_2$ was fed into molten sulfur with agitation. The resulting menstruum was maintained at 150° for 15 minutes and a portion of it was cast into a cylinder as in the preceding examples and the procedures of those examples were followed to compute the mils of penetration per year by water. The aluminum concentration in the cylinder was 0.11 gram per cc. The immersion water was changed at weekly intervals, and the following penetration rates in mills per year were found:

| | |
|---|---|
| 1st week | 2000 |
| 2nd week | 1480 |
| 3rd week | 1060 |
| 4th week | 750 |

The remainder of the mixture was then heated to 350° C., which temperature was maintained for 10 hours, thereafter this mixture was cast into a cylinder of the same size and having an aluminum concentration of 0.12 gram per cc. The same procedure was followed and the following penetration rate in mils per year was found:

| | |
|---|---|
| 1st week | <10 |
| 2nd week | <10 |

Inasmuch as these values were below the lower limits of measurement the actual values were probably even lower; in any event, a great improvement was demonstrated in resistance to leaching as a result of the heating to 350° C.

EXAMPLE VII

A melt at 80° C. consisted of $Fe(NO_3)_3 \cdot 9H_2O$, $Cr(NO_3)_3 \cdot 9H_2O$ and $Ni(NO_3)_2 \cdot 6H_2O$, in which the molar concentrations of Fe, Cr, and Ni were, respectively, 0.192, 0.048, and 0.027. The melt, which was spiked with a tracer amount of $Cs^{137}NO_3$, was fed gradually into molten sulfur with agitation, and the resulting menstruum was held at 150° C. for 35 minutes. A sample cylinder was then poured and the leaching penetration rates in mils per year were determined as in the other examples, as follows:

| | |
|---|---:|
| 1st week | 2000 |
| 2nd week | 1480 |
| 3rd week | 1060 |
| 4th week | 750 |
| After 100 days | 153 |

The remaining sulfur-melt mixture was then heated to 350° C. for 10 hours and cast into a cylinder, for which the following leaching penetration rates in mils per year were determined:

| | |
|---|---:|
| 1st week | 315 |
| 2nd week | 318 |
| 4th week | 289 |

EXAMPLE VIII

A melt of the same constituents as the melt in Example VII, had slightly different molar concentrations; viz, Fe 0.202, Cr 0.05, and Ni 0.028. The melt was fed into sulfur with agitation and the resulting menstruum was held at 150° C. for 30 minutes. A sample cylinder was then cast, from which the following penetration rates in mils per year were determined, as in the other examples:

| | |
|---|---:|
| 1st week | 550 |
| 2nd week | 465 |
| 3rd week | 440 |
| 10th week | 139 |

A portion of the mixture was then heated to 150° C. with a minor amount of "Thiokol." From a sample cylinder cast from this portion the following penetration rates in mils/yr. were determined:

| | |
|---|---:|
| 1st week | 415 |
| 2nd week | 230 |
| 3rd week | 217 |
| 10th week | 188 |

The original mixture was then heated to 350° C. for 10 hours. From a sample cylinder cast from this portion the following mils/yr. rates found:

| | |
|---|---:|
| 1st week | 94 |
| 2nd week | 175 |
| 3rd week | 201 |
| 10th week | 96 |

To the remaining portion a minor amount of "Thiokol" was added by heating at 150° C. for 30 minutes. From a sample cast from this, the following rates of penetration in mils/yr. were found:

| | |
|---|---:|
| 1st week | 68 |
| 2nd week | 42 |
| 3rd week | 32 |

The foregoing establishes that the second heating at 350° C. significantly changed the resistance to leaching, and that the addition of "Thiokol" did so, although to a lesser extent.

It is to be understood that the invention is not to be limited to the examples given, but only the scope of the appended claims.

What is claimed is:

1. A method of dehydrating and insolubilizing an aqueous nuclear reactor waste solution, comprising heating it with sulfur to a first temperature sufficient to dehydrate it and drive off volatile components and decomposition products, and then heating it to a second temperature sufficient to insolubilize its other components.

2. The method of claim 1 where the first temperature is from about 130 to about 160° C., and the second temperature is at least 350° C.

3. A method of dehydrating and insolubilizing a solution of dissolved nuclear reactor fuel elements containing a preponderance of stainless steel, comprising heating it with sulfur to a first temperature of from about 130 to about 160° C., and then heating to a second temperature of about 444° C.

4. The method of claim 3 where the second temperature is maintained for about 5 hours.

5. A method of dehydrating and insolubilizing a solution of dissolved nuclear reactor fuel elements containing a preponderance of aluminum, comprising heating it with sulfur to a first temperature of from about 130 to about 160° C., and then heating it to a second temperature of about 400° C.

6. The method of claim 5 where the second temperature is maintained for about 5 hours.

7. A method of nuclear reactor waste disposal in which the waste is dehydrated, insolubilized and encapsulated within a mass of inert material comprising mixing the waste with sulfur and heating the mixture to a first temperature sufficient to dehydrate it and drive off volatile components and decomposition products, and then heating to a second higher temperature sufficient to insolubilize its other waste components, and solidifying the residual mixture.

References Cited in the file of this patent

UNITED STATES PATENTS

| | | |
|---|---|---|
| 848,268 | Smith | Mar. 26, 1907 |
| 1,918,684 | Bragg | July 18, 1933 |
| 2,616,847 | Ginell | Nov. 4, 1952 |
| 2,961,399 | Alberti | Nov. 22, 1960 |

OTHER REFERENCES

"Economic Evaluation of Permanent Disposal of Radioactive Wastes," Herrington et al., Nuclonics, vol. 11, No. 9, September 1953, pages 34–37.

"The Disposal of Fission Products in Glass," Watson et al., Proc. of 2d U.N. Int. Conf. on the Peaceful Uses of Atomic Energy, vol. 18, 1958, United Nations, Geneva, pp. 19–26.